F. W. HANNA.
SELF REGISTERING WATER METER.
APPLICATION FILED JUNE 30, 1909.
946,128.
Patented Jan. 11, 1910.
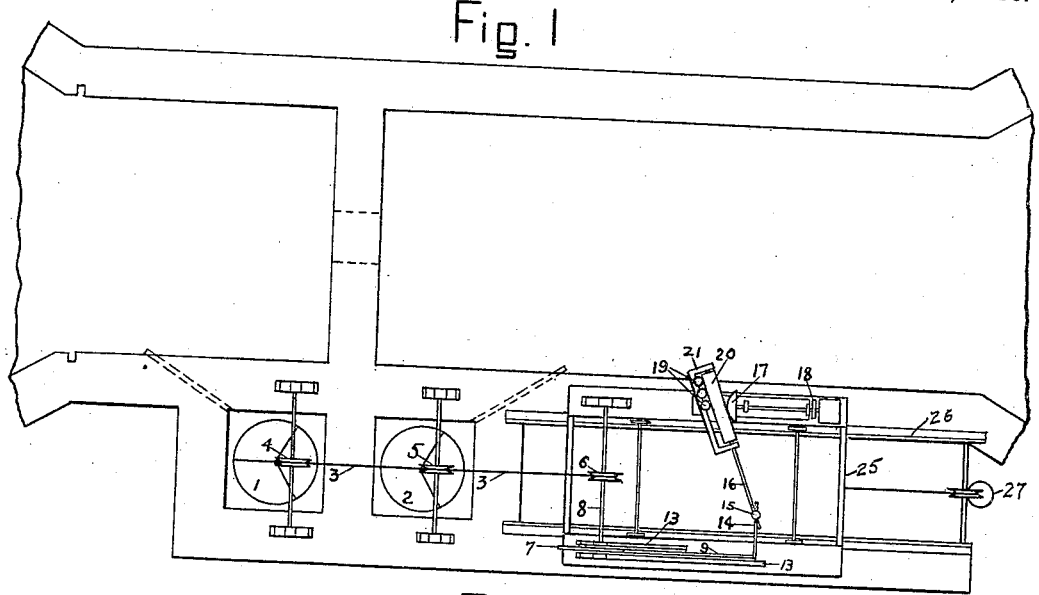
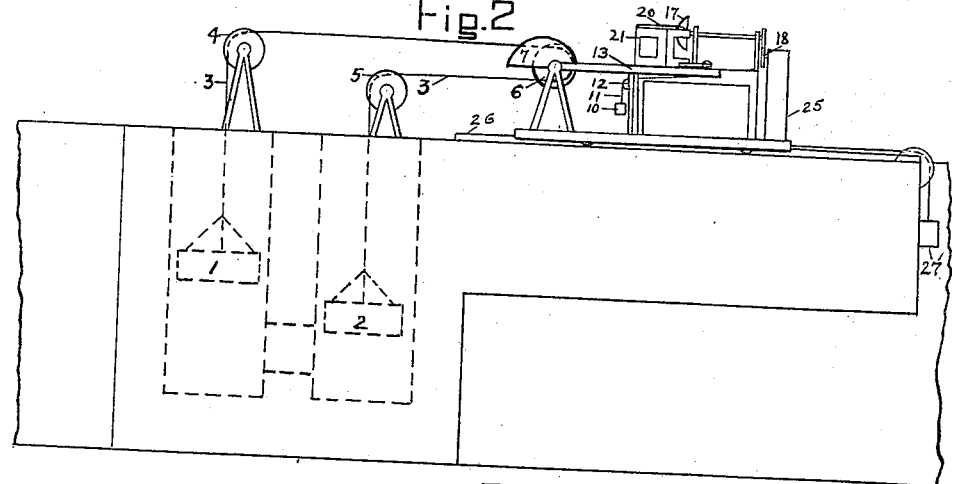
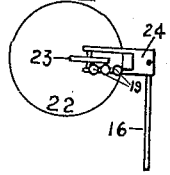
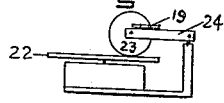
Witnesses
W. G. Stuward
Fred L. Cavin
Inventor
Frank W. Hanna

UNITED STATES PATENT OFFICE.

FRANK W. HANNA, OF BOISE, IDAHO.

SELF-REGISTERING WATER-METER.

946,128.   Specification of Letters Patent.   Patented Jan. 11, 1910.

Application filed June 30, 1909. Serial No. 505,298.

*To all whom it may concern:*

Be it known that I, FRANK W. HANNA, a citizen of the United States, residing at Boise, in the county of Ada and State of Idaho, have invented a new and useful Improvement in Self-Registering Water-Meters, of which the following is a specification.

The invention relates to self-registering water meters and has for its object the measuring and registering of the quantity of water discharged through a submerged orifice in a canal. This object is attained by the use of a float actuated by the fluctuating height of water in the canal above the submerged orifice and a second float actuated by the fluctuating height of water in the canal below the submerged orifice that together control, by means of a cam-wheel and a sliding bar maintained in contact therewith, the arm of a mechanical integrator provided with a clock mechanism and a registering device, the cam-wheel, sliding bar and mechanical integrator being mounted on a counterweighted carriage consisting of a suitable frame-work for carrying these mountings and adapted either to slide or roll on a track.

In the accompanying drawing illustrating the invention, Figure 1 shows a plan of the device containing a submerged orifice in a canal; floats in float chambers suitably connected with the canal above and below the orifice; a cam-wheel and its mechanical connections with the floats; a sliding bar with a means of maintaining contact between it and the perimeter of the cam-wheel and with a means of connecting it with the arm of a mechanical integrator; a spherical mechanical integrator provided with an arm, a propeller, a clock mechanism and a registering device; and a counterweighted carriage, on which are mounted the said cam-wheel and mechanical integrator: Fig. 2 shows a side elevation of the structures and mechanisms shown in plan in Fig. 1: Fig. 3 shows a plan of a plate mechanical integrator that may be used instead of the spherical mechanical integrator shown in Figs. 1 and 2: and Fig. 4 shows an elevation of the plate mechanical integrator.

In Figs. 1 and 2, the float 1 is connected to the float 2 by the cord 3 passing over the sheaves 4, 5 and 6, the latter of which is mounted, in common with the cam-wheel 7, on the shaft 8. The sliding bar 9, kept in contact with the perimeter of the cam-wheel 7 by the weight 10 and the cord 11 passing over the pulley 12, moves in the grooved guides 13 and is connected by means of the rod 14 to the sliding swivel 15 attached to the integrator arm 16. The spherical propeller 17 actuated by the clock-driven gear 18 operates the registering dials 19 through the mechanical connections provided by the cylinder 20, the axis of rotation of which intersects that of the spherical propeller. The cylinder 20, with its axis parallel to the center line of the integrator arm, is set in the frame 21 mounted on an axis perpendicular to the plane determined by the axes of rotation of the cylinder and of the propeller and intersecting the axis of rotation of the propeller.

The mechanical integrator to be used in the combinations claimed in this invention is not limited to the kind shown in Figs. 1 and 2, but may be of any kind suitable for effecting a register of the discharge.

Figs. 3 and 4 show a plate mechanical integrator arranged for effecting the register of discharge when substituted for the spherical mechanical integrator above described. The clock-driven plate propeller 22 turning on an axis perpendicular to the surface of the plate operates the registering dials 19 through the mechanical connections provided by the wheel 23, the axis of rotation of which is parallel to the surface of the propeller plate. The wheel 23, with its axis also parallel to the center line of the integrator arm, is set in the frame 24 mounted on an axis in the plane of the contact circumference of the wheel 23, perpendicular to the surface of the propeller plate and intersecting the center line of the integrator arm 16. The carriage 25 is shifted in position on the track 26 in one direction by the counterweight 27 and in the other direction by the floats 1 and 2 as the water surfaces in the canal above and below the submerged orifice fluctuate without changing the hydrostatic head on the orifice. By this arrangement the measuring mechanism is constantly maintained in proper position for performing its function.

In order that the register of the integrator may indicate the true amount of the discharge through the orifice, the effect of velocity of approach being neglected, the perimeter of the cam-wheel should be determined by the polar equation, $r = CR\frac{1}{2}\theta\frac{1}{2}$, the origin of coördinates being in the center line of the shaft on which the cam-wheel is mounted and in the plane of the cam-wheel perimeter, in which equation $r$ is the radius vector of the perimeter of the cam-wheel, R the radius of the sheave on the cam-wheel shaft over which the float cord passes, $\theta$ the angle of rotation through which the cam-wheel shaft turns as the hydrostatic head on the orifice changes from zero to a value at which the point, $r$, $\theta$, of the perimeter of the cam-wheel comes in contact with the end of the sliding bar, C a constant for fixing a desirable value for the ratio of $r$ to $R^{\frac{1}{2}}\theta^{\frac{1}{2}}$. By assigning suitable values to C the magnitude of the values of $r$ corresponding to particular values of R and $\theta$ may be controlled and the size of the cam-wheel held within desirable limits. Where necessity requires, the values of $r$ may be corrected for velocity of approach in the canal.

The connections between the floats and the arm of the mechanical integrator are such that the integrator arm maintains the registering device of the integrator in such a position that motion proportional to the simultaneous discharges through the orifice is transmitted to it by the clock-driven spherical or plate propeller. The unit-discharge element of the register is effected by the position of the integrator arm and the time element is supplied by the clock-driven spherical or plate propeller. The registering dials will indicate the quantity of water discharged in any given period of time in units depending for their values on the instrumental constants of the mechanical integrator. In accordance with the usual customs of measuring water, the instrumental constants will generally be so chosen that the register may indicate gallons, cubic feet, or acre-feet.

Having described my invention I now make the following claims:

1. In a device for measuring the flow of water in a canal through a submerged orifice, means consisting of a float actuated by the water on the upstream side of the said orifice, a second float actuated by the water on the down-stream side of the said orifice; a carriage; a counterweight attached to the said carriage; a shaft mounted on the said carriage; a sheave mounted on the said shaft; a flexible cord attached to the said floats and passing over the said sheave; the whole combination effecting rotation of the said shaft proportional to changes occurring in the relative vertical distance between the two floats.

2. In a device for measuring the flow of water in a canal through a submerged orifice, means consisting of a float actuated by the water on the upstream side of the said orifice, a second float actuated by the water on the down-stream side of the said orifice; a carriage; a counterweight attached to the said carriage; a shaft mounted on the said carriage; a sheave mounted on the said shaft; a flexible cord attached to the said floats and passing over the said sheave; a cam-wheel mounted on the said shaft and having the successive radius vectors of its perimeter measured from its center of rotation proportional to the successive discharges of the orifice for corresponding hydrostatic heads thereon between zero and a suitable upper limit; the whole combination effecting rotation of the said shaft proportional to changes in the relative vertical distance between the two floats.

3. In a device for measuring the flow of water in a canal through a submerged orifice, means consisting of a float actuated by the water on the upstream side of the said orifice, a second float actuated by the water on the down-stream side of the said orifice; a carriage; a counterweight attached to the said carriage; a shaft mounted on the said carriage; a sheave mounted on the said shaft; a flexible cord attached to the said floats and passing over the said sheave; a cam-wheel mounted on the said shaft and having the successive radius vectors of its perimeter measured from its center of rotation proportional to the successive discharges of the said orifice for corresponding hydrostatic heads thereon between zero and a suitable upper limit; a mechanical integrator provided with an arm, a propeller, a clock mechanism and a registering device; and a means for mechanically connecting the said cam-wheel with the arm of the said mechanical integrator; the whole combination effecting a register of the quantity of water discharged through the said orifice.

4. In a device for measuring the flow of water in a canal through a submerged orifice, means consisting of a float actuated by the water on the upstream side of the said orifice, a second float actuated by the water on the down-stream side of the said orifice; a carriage; a counterweight attached to the said carriage; a shaft mounted on the said carriage; a sheave mounted on the said shaft; a flexible cord attached to the said floats and passing over the said sheave; a cam-wheel mounted on the said shaft and having the successive radius vectors of its perimeter measured from its center of rotation proportional to the successive discharges of the said orifice for corresponding hydrostatic heads thereon between zero and a suitable upper limit; a mechanical integrator provided with an arm, a propeller, a clock mechanism and a registering device; a sliding bar; a means for securing continuous contact between the said sliding bar and the perimeter of the said cam-wheel; a means for mechanically connecting the said sliding bar with the arm of the said mechanical integrator; the whole combination effecting a register of the quantity of water discharged through the said orifice.

5. In a device for measuring the flow of water in a canal through a submerged orifice, means consisting of a float actuated by the water on the upstream side of the said orifice, a second float actuated by the water on the down-stream side of the said orifice; a carriage; a counterweight attached to the said carriage; a shaft mounted on the said carriage; a sheave mounted on the said shaft; a flexible cord attached to the said floats and passing over the said sheave; a cam-wheel mounted on the said shaft and having the successive radius vectors of its perimeter measured from its center of rotation proportional to the successive discharges of the said orifice for corresponding hydrostatic heads thereon between zero and a suitable upper limit; a spherical mechanical integrator provided with an arm, a propeller, a clock mechanism and a registering device; a sliding bar; a means for connecting the said sliding bar with the arm of the said integrator; a means for securing continuous contact between the said sliding bar and the said perimeter of the said cam-wheels; the whole combination effecting a register of the quantity of water discharged through the said orifice.

FRANK W. HANNA.

Witnesses:
   FRED L. CAVIS,
   W. G. STEWARD.